US012640653B2

(12) United States Patent
Kubota

(10) Patent No.: US 12,640,653 B2
(45) Date of Patent: May 26, 2026

(54) POWER SUPPLY CONTROL DEVICE

(71) Applicant: ROHM CO., LTD., Kyoto (JP)

(72) Inventor: Kanto Kubota, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 252 days.

(21) Appl. No.: 18/620,381

(22) Filed: Mar. 28, 2024

(65) Prior Publication Data

US 2024/0333159 A1      Oct. 3, 2024

(30) Foreign Application Priority Data

Mar. 29, 2023    (JP) ................................. 2023-052939

(51) Int. Cl.
H02M 3/158        (2006.01)
H02M 3/157        (2006.01)

(52) U.S. Cl.
CPC ......... H02M 3/1584 (2013.01); H02M 3/157 (2013.01)

(58) Field of Classification Search
CPC ........................... H02M 3/1584; H02M 3/157
See application file for complete search history.

(56) References Cited

U.S. PATENT DOCUMENTS 6,396,250 B1 * 5/2002 Bridge ................. H03K 17/165
                                                    323/283
11,614,478 B2 * 3/2023 Schemm ............ H03K 17/0822
                                                    324/762.09
2017/0012529 A1 * 1/2017 Yamada ................ H02M 3/158

FOREIGN PATENT DOCUMENTS

JP        2020-141223        9/2020

* cited by examiner

*Primary Examiner* — Rafael O De Leon Domenech
(74) *Attorney, Agent, or Firm* — Fish & Richardson P.C.

(57)        ABSTRACT
A power supply control device configured to control first and second DC/DC converters, each of which is a step-down or a step-up converter, of first and second channels respectively, wherein the step-down and step-up converters respectively include a first switch output stage including high-side and low-side transistors and a second switch output stage including a switching element and an inductor, wherein a switching voltage is generated at a node where the high-side and low-side transistors are connected or where the inductor and the switching element are connected, and the high-side transistor or the switching element is turned on during an on-time, and wherein the power supply control device includes: first and second PWM controllers performing PWM control on the first or second switch output stage in the first and second DC/DC converters respectively; and a delay controller delaying a switch voltage of a channel having a longer on-time.

10 Claims, 12 Drawing Sheets

POWER SUPPLY CONTROL DEVICE

CROSS-REFERENCE TO RELATED APPLICATION

This application is based upon and claims the benefit of priority from Japanese Patent Application No. 2023-052939, filed on Mar. 29, 2023, the entire contents of which are incorporated herein by reference.

TECHNICAL FIELD

The present disclosure relates to a power supply control device.

BACKGROUND

In the related art, a PMIC (power management IC) that controls DC/DC converters of multiple channels is known.

BRIEF DESCRIPTION OF DRAWINGS

The accompanying drawings, which are incorporated in and constitute a part of the specification, illustrate embodiments of the present disclosure.

FIG. 3 is a diagram illustrating a configuration of a power supply control device according to a first embodiment.

FIG. 6 is a diagram illustrating a configuration of a power supply control device according to a second embodiment.

FIG. 7 is a diagram illustrating a configuration of a power supply control device according to a third embodiment.

FIG. 8 is a diagram illustrating a configuration of a power supply control device according to a fourth embodiment.

FIG. 11 is a diagram illustrating a configuration of a power supply control device according to a fifth embodiment.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Exemplary embodiments of the present disclosure will be described below with reference to the drawings.

1. Comparative Example

Herein, a comparative example will be first described below before describing the embodiments of the present disclosure. This will make problems clearer.

Figure 1:
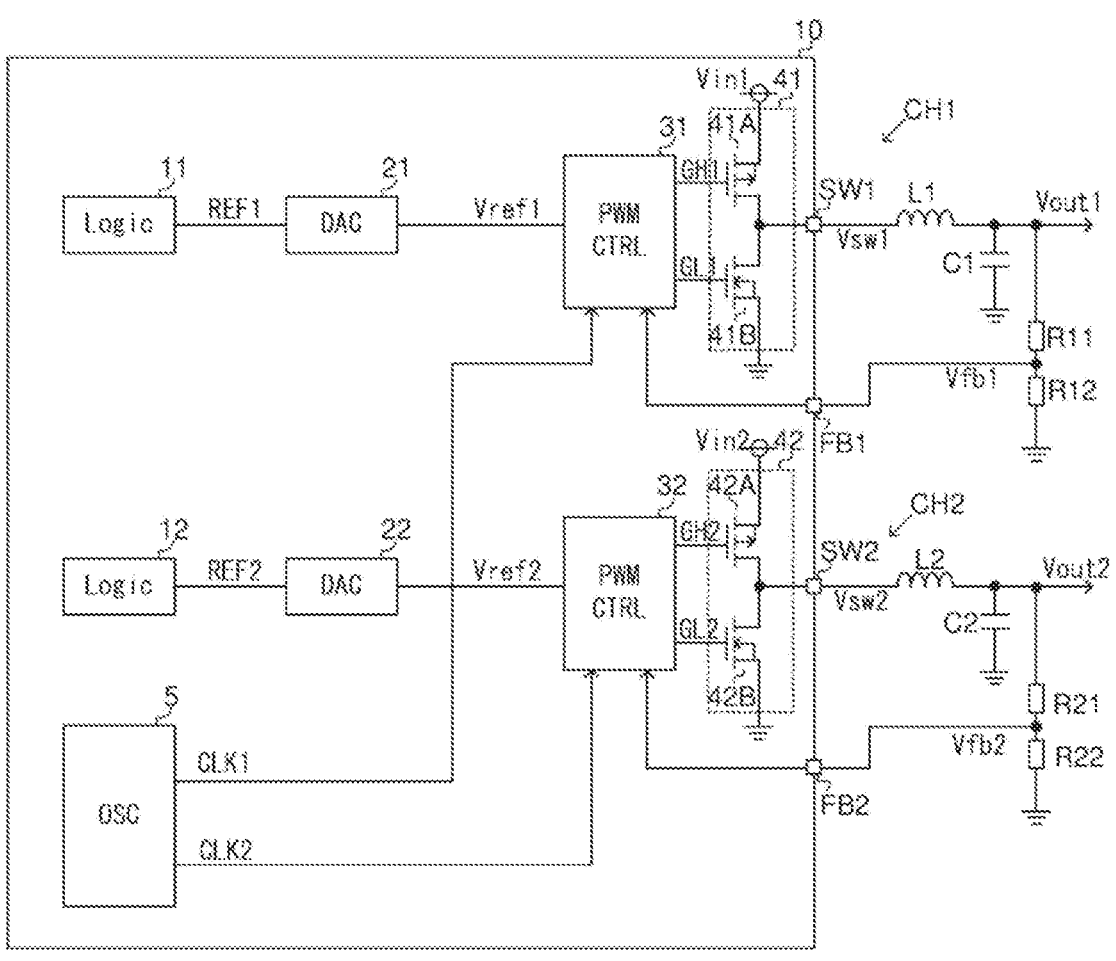
FIG. 1 is a diagram illustrating a configuration of a power supply control device according to a comparative example.

FIG. 1 is a diagram illustrating a configuration of a power supply control device 10 according to a comparative example. The power supply control device 10 is a PMIC (semiconductor device) configured to control a DC/DC converter CH1 of channel 1 and a DC/DC converter CH2 of channel 2.

The DC/DC converter CH1 is a step-down converter that steps down an input voltage Vin1 to generate an output voltage Vout1, and includes a switch output stage 41, an inductor L1, a capacitor C1, and voltage divider resistors R11 and R12.

The switch output stage 41 includes a high-side transistor 41A and a low-side transistor 41B. The high-side transistor 41A and the low-side transistor 41B are connected in series between a terminal to which the input voltage Vin1 is applied and a ground terminal (terminal to which a ground potential is applied). The high-side transistor 41A is, for example, a PMOS transistor (P-channel MOSFET (Metal-Oxide-Semiconductor Field Effect Transistor)), and the low-side transistor 41B is, for example, an NMOS transistor (N-channel MOSFET).

The high-side transistor 41A and the low-side transistor 41B are built into the power supply control device 10. However, the high-side transistor 41A and the low-side transistor 41B may be externally connected to the power supply control device 10.

A node to which the high-side transistor 41A and the low-side transistor 41B are connected is connected to a switch terminal SW1. The switch terminal SW1 and a feedback terminal FB1 are external terminals provided on the power supply control device 10. The inductor L1, the capacitor C1, and the voltage divider resistors R11 and R12 are provided outside the power supply control device 10. The switch terminal SW1 is connected to a first terminal of the inductor L1. A second terminal of the inductor L1 is connected to a first terminal of the capacitor C1. A second terminal of the capacitor C1 is connected to a ground terminal.

An output voltage Vout1 is generated at the first terminal of the capacitor C1. The voltage divider resistors R11 and R12 divide the output voltage Vout1 to generate a feedback voltage Vfb1.

A PWM controller 31 performs PWM (pulse width modulation) control on the DC/DC converter CH1. The PWM controller 31, a logic 11, and a DAC (DA converter) 21 are built into the power supply control device 10 and are configurations corresponding to channel 1. A reference voltage signal REF1 outputted from the logic 11 is DA (digital-to-analog) converted by the DAC 21 to become a reference voltage Vref1. The reference voltage Vref1 defines a target value of the output voltage Vout1.

An oscillator 5 is built into the power supply control device 10. The PWM controller 31 switches the switch output stage 41 by PWM control based on the reference voltage Vref1, a clock CLK1 outputted from the oscillator 5, and the feedback voltage Vfb1 inputted through the feedback terminal FB1.

Figure 2:
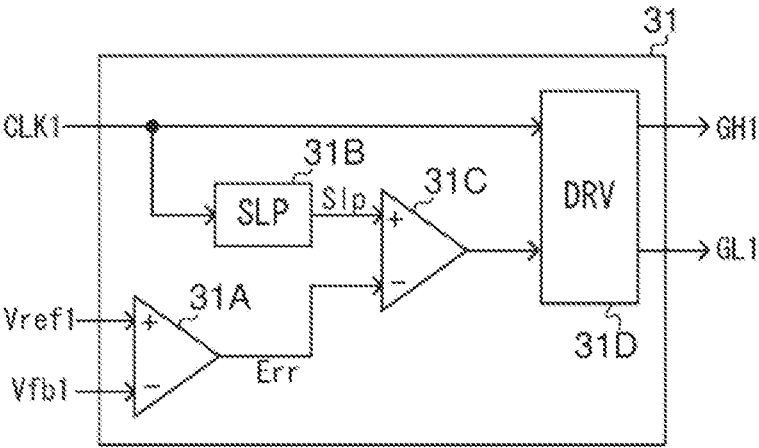
FIG. 2 is a diagram illustrating an internal configuration of a PWM controller.

FIG. 2 is a diagram illustrating an internal configuration of the PWM controller 31. The PWM controller 31 includes an error amplifier 31A, a slope generator 31B, a comparator 31C, and a driver 31D. The reference voltage Vref1 is inputted to a first input terminal of the error amplifier 31A.

The feedback voltage Vfb1 is inputted to a second input terminal of the error amplifier 31A. The error amplifier 31A amplifies an error between the reference voltage Vref1 and the feedback voltage Vfb1 and outputs an error signal Err. The slope generator 31B generates a slope signal (triangular wave signal) Slp based on the clock CLK1. The slope signal Slp is inputted to a first input terminal of the comparator 31C. The error signal Err is inputted to a second input terminal of the comparator 31C. The driver 31D generates pulsed gate signals GH1 and GL1 based on the clock CLK1 and an output of the comparator 31C. The gate signal GH1 is inputted to a gate of the high-side transistor 41A. The gate signal GL1 is inputted to a gate of the low-side transistor 41B.

The high-side transistor 41A and the low-side transistor 41B are driven complementarily by the gate signals GH1 and GL1. The high-side transistor 41A is turned on (switched from an off state to an on state) at a rising timing of the clock CLK1. The high-side transistor 41A is turned off (switched from an on state to an off state) at a timing when the slope signal Slp exceeds the error signal Err. A period of the clock CLK1 is a switching period. An on-duty (=ratio of an on-time of the high-side transistor 41A to the switching period) is adjusted so that the feedback voltage Vfb1 matches the reference voltage Vref1, and the output voltage Vout1 is controlled to a desired target value.

When the high-side transistor 41A is at an on state and the low-side transistor 41B is at an off state, a switch voltage Vsw1 generated at the switch terminal SW1 is at a high level. When the high-side transistor 41A is at an off state and the low-side transistor 41B is at an on state, the switch voltage Vsw1 is at a low level. Due to the complementary switching of the high-side transistor 41A and the low-side transistor 41B, the switch voltage Vsw1 is pulsed.

The configuration of channel 2 is the same as that of channel 1 described above. Therefore, a simplified description will be given here. The DC/DC converter CH2 is a step-down converter that steps down an input voltage Vin2 to generate an output voltage Vout2, and includes a switch output stage 42, an inductor L2, a capacitor C2, and voltage divider resistors R21 and R22. As the configuration of the channel 2, the power supply control device 10 includes a logic 12, a DAC 22, and a PWM controller 32. A reference voltage signal REF2 outputted from the logic 12 is DA-converted by the DAC 22 into a reference voltage Vref2. The PWM controller 32 controls the switch output stage 42 by PWM control based on a feedback voltage Vfb2 obtained by dividing the output voltage Vout2 by the voltage divider resistors R21 and R22, the reference voltage Vref2, and a clock CLK2 outputted from the oscillator 5. Gate signals GH2 and GL2 generated by the PWM controller 32 are respectively inputted to a gate of a high-side transistor 42A and a gate of a low-side transistor 42B in the switch output stage 42. A pulsed switch voltage Vsw2 is generated at a switch terminal SW2 connected to a node to which the high-side transistor 42A and the low-side transistor 42B are connected. The feedback voltage Vfb2 is inputted to the PWM controller 32 via a feedback terminal FB2.

The switch voltage Vsw1 of channel 1 and the switch voltage Vsw2 of channel 2 are generated as described above. However, when switching edges (rising edge and falling edge) of the switch voltages Vsw1 and Vsw2 overlap, jitter occurs in the switch voltages Vsw1 and Vsw2, ripples of the output voltages Vout1 and Vout2 become large, and a noise level increases.

Therefore, the power supply control device 10 according to the comparative example is equipped with a phase shift function that prevents the switching edges of the switch voltages Vsw1 and Vsw2 from overlapping by shifting phases of the clocks CLK1 and CLK2 so that the noise level is reduced. Appropriate setting for a phase shift pattern is performed manually after checking the actual waveform.

However, the above comparative example is effective when the input voltages Vin1 and Vin2 and the output voltages Vout1 and Vout2 are fixed. If at least one of the input voltages Vin1 and Vin2 and the output voltages Vout1 and Vout2 is set to be changed from an expected value within the same model (same power supply control device 10), the on-duty of the PWM control changes, and the switching edges of the switch voltages Vsw1 and Vsw2 may overlap depending on an installed phase shift pattern.

Further, since the phase shift pattern is generated by a logic circuit in the oscillator 5, an increase in the number of patterns leads to an increase in circuit area. Pattern creation also gives rise to a problem in that it affects design time.

2. First Embodiment

Figure 3:
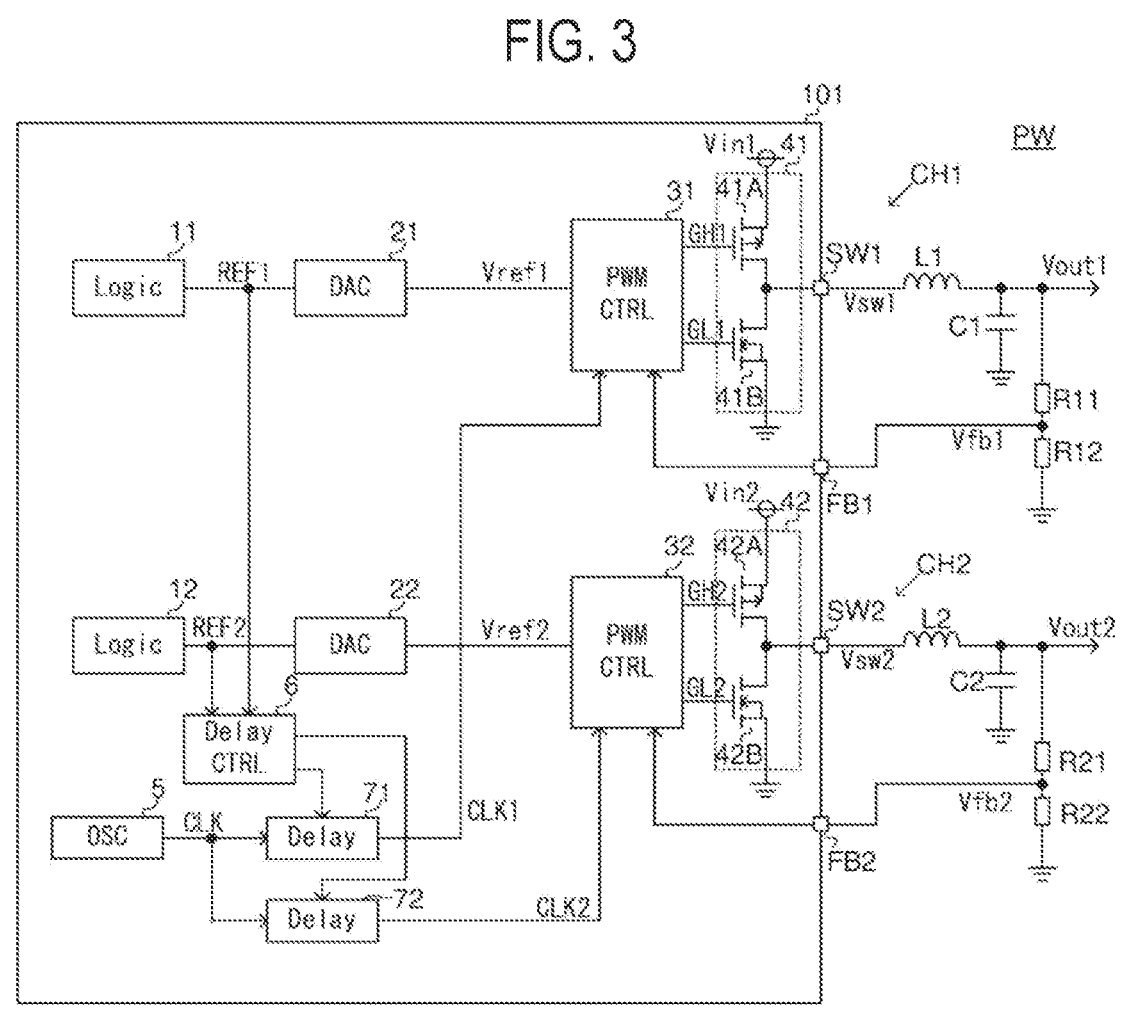

FIG. 3 is a diagram illustrating a configuration of a power supply control device 101 according to a first embodiment of the present disclosure. The configuration shown in FIG. 3 differs from the configuration of the comparative example (shown in FIG. 1) in that a delay controller 6 and delay circuits 71 and 72 are added to the power supply control device 101. A power supply device PW includes a power supply control device 101, a DC/DC converter CH1 of channel 1, and a DC/DC converter CH2 of channel 2. Switch output stages 41 and 42 may be provided outside the power supply control device 101.

The delay controller 6 receives a reference voltage signal REF1 outputted from a logic 11 and a reference voltage signal REF2 outputted from a logic 12, and determines a magnitude relationship between output voltages Vout1 and Vout2 based on the reference voltage signals REF1 and REF2 received. The delay controller 6 turns on one of the delay circuits 71 and 72 and turns off the other based on the determined magnitude relationship. Specifically, the delay circuit is turned on in the channel that has a higher voltage out of the output voltages Vout1 and Vout2.

The delay circuit 71 is provided to correspond to channel 1, and is configured to delay an input clock CLK outputted from the oscillator 5 and output a clock CLK1 to a PWM controller 31. The delay circuit 72 is provided to correspond to channel 2, and is configured to delay an input clock CLK outputted from the oscillator 5 and output a clock CLK2 to a PWM controller 32. When the delay circuits 71 and 72 are in an off state, delay functions thereof are disabled and the clocks CLK1 and CLK2 are outputted without delaying the input clock CLK. When the delay circuits 71 and 72 are in an on state, the delay functions thereof are enabled. The delay circuits 71 and 72 include, for example, multi-stage inverters.

Figure 4:
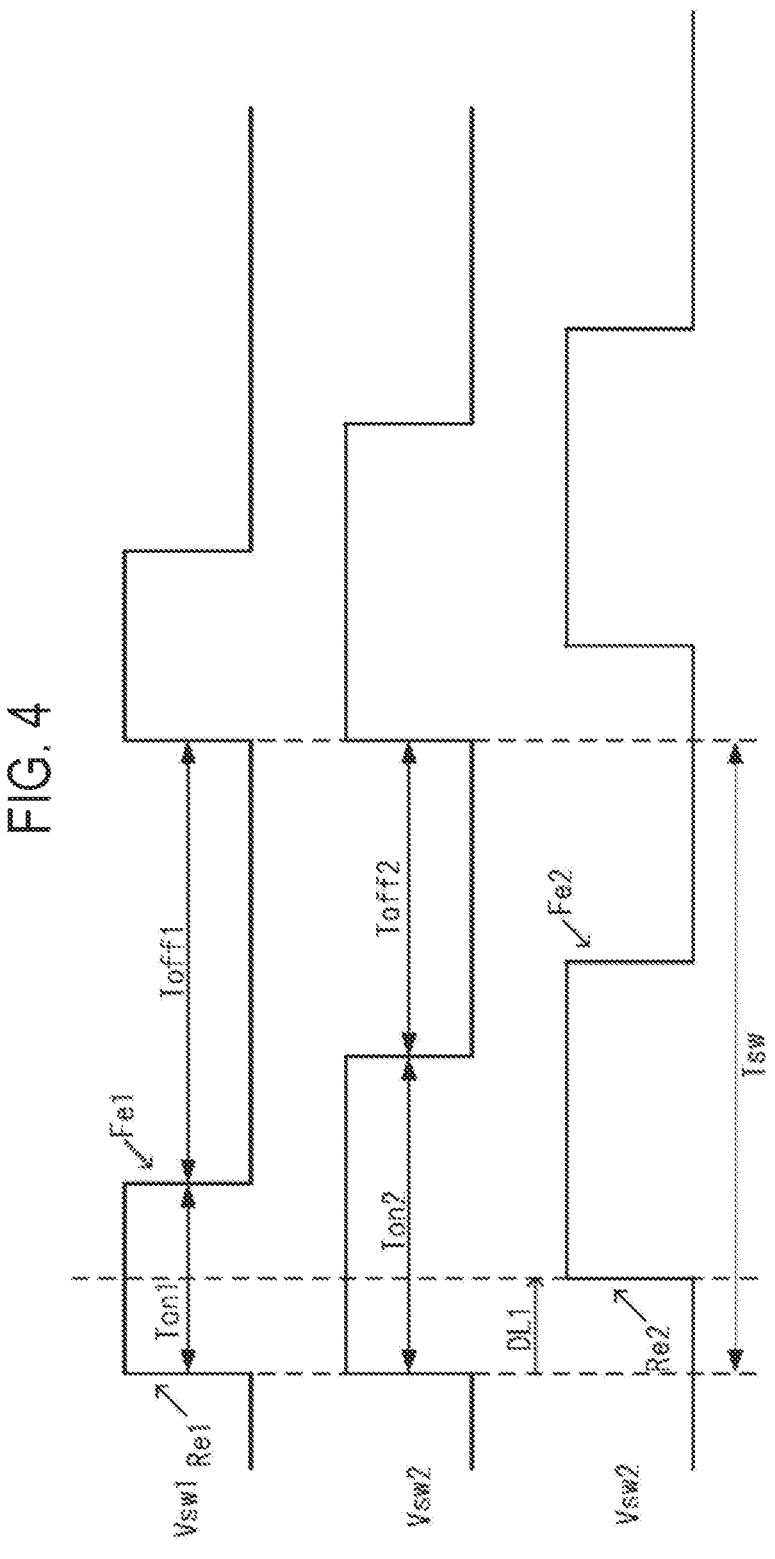
FIG. 4 is a diagram illustrating an example of waveform of a switch voltage according to the first embodiment.

FIG. 4 is a diagram illustrating an example of waveforms of switch voltages Vsw1 and Vsw2 in the configuration shown in FIG. 3. In FIG. 4, the upper row shows the switch voltage Vsw1, the middle row shows the switch voltage Vsw2 when no delay is performed, and the lower row shows the switch voltage Vsw2 when a delay is performed.

Since the DC/DC converters CH1 and CH2 are step-down converters, on-duties Duty1 and Duty2 thereof are represented by following formulae.

$$Duty1 = Vout1/Vin1$$

$$Duty2 = Vout2/Vin2$$

As shown in FIG. 4, an on-time Ton1 of the switch voltage Vsw1 (a period in which the high-side transistor 41A is turned on and hence the switch voltage Vsw1 is at a high level) and an on-time Ton2 of the switch voltage Vsw2 (a period in which the high-side transistor 42A is turned on and hence the switch voltage Vsw2 is at a high level) are represented by the following formulae, respectively, where Tsw is a switching period (=period of the input clock CLK).

$$Ton1 = Tsw \times Duty1 = Tsw \times (Vout1/Vin1)$$

$$Ton2 = Tsw \times Duty2 = Tsw \times (Vout2/Vin2)$$

As shown in FIG. 4, an off-time Toff1 of the switch voltage Vsw1 is a period in which the low-side transistor 41B is turned on and hence the switch voltage Vsw1 is at a low level, and an off-time Toff2 of the switch voltage Vsw2 is a period in which the low-side transistor 42B is turned on and hence the switch voltage Vsw2 is at a low level. The off-time Toff1 and the off-time Toff2 are represented by the following formulae.

$$Toff1 = Tsw - Ton1$$

$$Toff2 = Tsw - Ton2$$

When Vin1=Vin2, the on-time Ton1 or Ton2 corresponding to the larger of Vout1 and Vout2 becomes longer. That is, for example, when Vout1>Vout2, Ton1>Ton2. The delay controller 6 determines a magnitude relationship between the output voltages Vout1 and Vout2 based on the reference voltage signals REF1 and REF2, thereby turning on the delay circuit 71 or 72 of the channel having a larger output voltage. In the example of FIG. 4, Ton2>Ton1 is established from Vout2>Vout1, and the delay circuit 72 of channel 2 is turned on (the delay circuit 71 is turned off). As a result, the input clock CLK is delayed to generate a clock CLK2, and the switch voltage Vsw2 is delayed with respect to the switch voltage Vsw1. A delay time DL1 is a fixed value set by the delay circuit 72.

As a result, a falling edge Fe2 of the switch voltage Vsw2 of the longer on-time Ton2 is spaced apart from a falling edge Fe1 of the other switch voltage Vsw1, so that the falling edges Fe1 and Fe2 are prevented from overlapping. At this time, a rising edge Re2 of the switch voltage Vsw2 should not overlap with the falling edge Fe1 of the switch voltage Vsw1 due to the delay, so the delay time DL1 needs to be shorter than the on-time Ton1.

Figure 5:
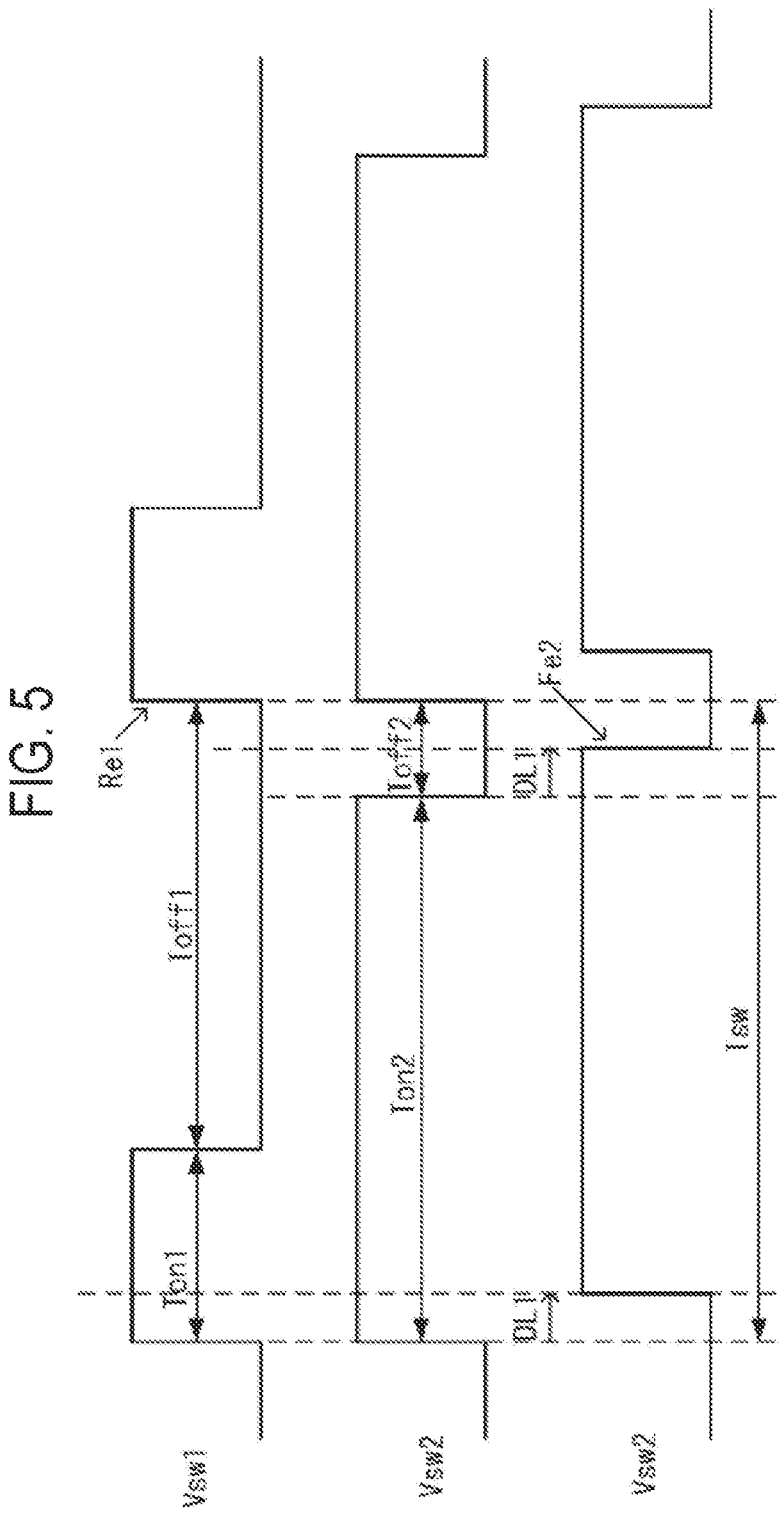
FIG. 5 is a diagram illustrating an example of waveform of a switch voltage according to the first embodiment.

FIG. 5 is a diagram illustrating another example of waveforms of the switch voltages Vsw1 and Vsw2 in the configuration shown in FIG. 3. In the example shown in FIG. 5, the off-time Toff2 of the switch voltage Vsw2 of the longer on-time Ton2 is shorter than Ton1. In this case, as shown in FIG. 5, the delay time DL1 for delaying the switch voltage Vsw2 needs to be shorter than Toff2 as well. This makes it possible to prevent the falling edge Fe2 of the switch voltage Vsw2 from overlapping with a rising edge Re1 of the switch voltage Vsw1.

Also, if a duty of a switch voltage having a shorter on-time is less than a predetermined duty (e.g., 20% or less), the switch voltage is always delayed by a predetermined delay time (e.g., 80 ns).

3. Second Embodiment

Figure 6:
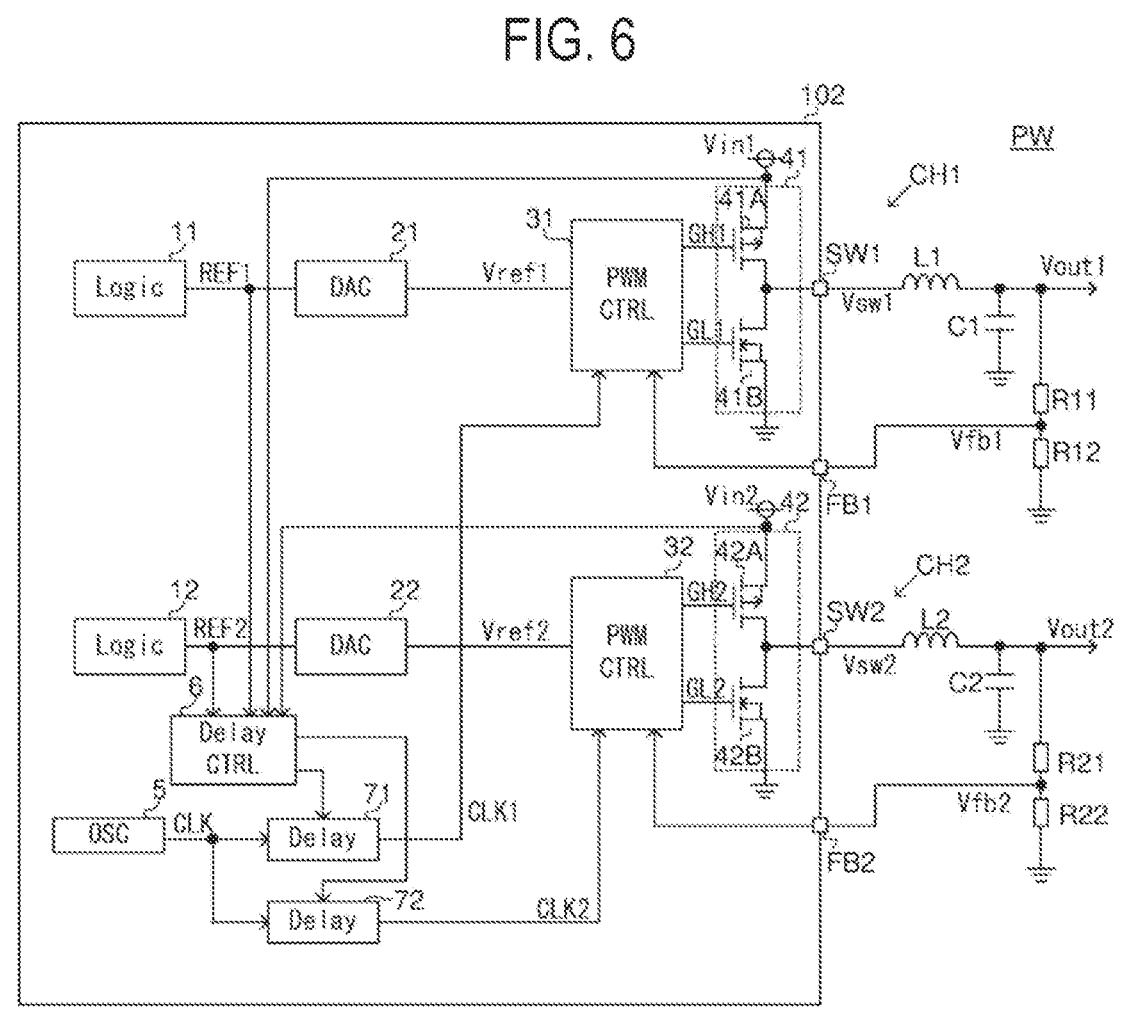

FIG. 6 is a diagram illustrating a configuration of a power supply control device 102 according to a second embodiment of the present disclosure. The configuration shown in FIG. 6 differs from the configuration of the first embodiment (shown in FIG. 3) in that in the power supply control device 102, the delay controller 6 receives input voltages Vin1 and Vin2 in addition to the reference voltage signals REF1 and REF2.

The output voltages Vout1 and Vout2 are specified by the reference voltage signals REF1 and REF2, and it is possible to calculate the on-times Ton1 and Ton2 from the output voltages Vout1 and Vout2 and the input voltages Vin1 and Vin2 as stated in the above formulae. In the present embodiment, the delay controller 6 calculates the on-times Ton1 and Ton2 based on the reference voltage signals REF1 and REF2 and the input voltages Vin1 and Vin2. Then, the delay controller 6 enables the delay function of the delay circuit 71 or 72 for the channel that has a longer on-time between the calculated on-times Ton1 and Ton2. At this time, the delay controller 6 sets the delay time to be a predetermined ratio (e.g., 50%) of a shorter on-time out of the calculated on-times Ton1 and Ton2.

Therefore, the delay times in the delay circuits 71 and 72 are configured to be variable. For example, the delay time may be varied by varying the number of inverter stages according to the control of the delay controller 6.

For example, in the example of the waveform of FIG. 4 described above, the calculated on-times Ton1 and Ton2 satisfy Ton2>Ton1, so the delay function of the delay circuit 72 corresponding to channel 2, which has a longer on-time, is enabled. At this time, in the example of FIG. 4, the delay time DL1 is set to be 50% of Ton1.

For example, as shown in FIG. 5 mentioned above, if Toff2<Ton1 while the calculated on-times Ton1 and Ton2 satisfy Ton2>Ton1, the delay time DL1 is set to be 50% of Toff2. That is, the delay controller 6 may calculate the off-time Toff1 or Toff2 corresponding to the longer of the calculated on-times Ton1 and Ton2, using the above-mentioned formulae, and may set a predetermined ratio of the calculated off-time to be the delay time.

Further, the present embodiment is applicable not only to the case where both the output voltages Vout1 and Vout2 and the input voltages Vin1 and Vin2 are set to be variable, but also to a case where only one of the output voltages Vout1 and Vout2 and the input voltages Vin1 and Vin2 is set to be variable.

4. Third Embodiment

Figure 7:
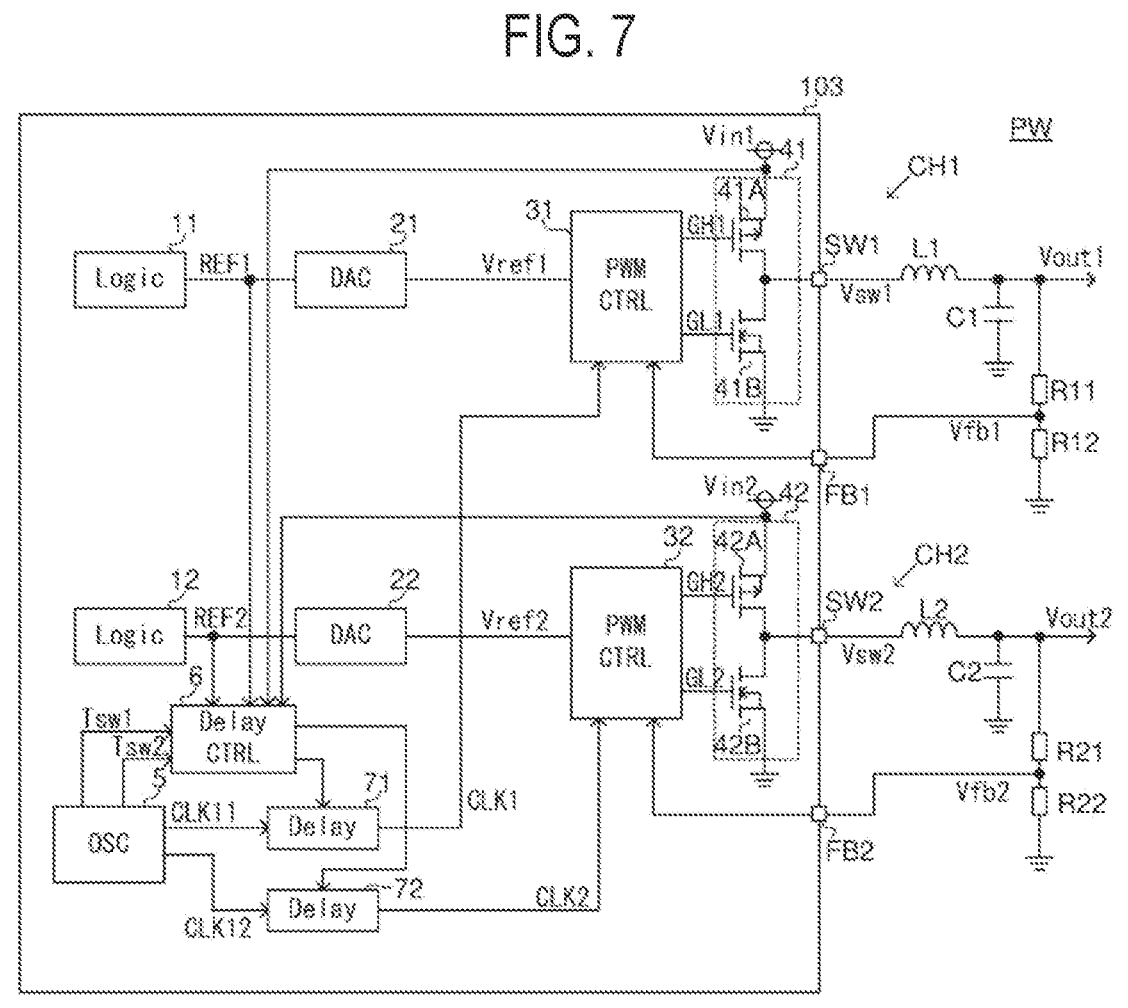

FIG. 7 is a diagram illustrating a configuration of a power supply control device 103 according to a third embodiment. The configuration shown in FIG. 7 differs from the configuration of the second embodiment (shown in FIG. 6) in that in the power supply control device 103, the delay controller 6 receives switching period information Tsw1 for channel 1 and switching period information Tsw2 for channel 2 from the oscillator 5 in addition to the reference voltage signals REF1 and REF2 and the input voltages Vin1 and Vin2. The switching period information Tsw1 and Tsw2 represents periods of input clocks CLK11 and CLK12. The oscillator 5 may output different input clocks CLK11 and CLK12 to the respective delay circuits 71 and 72.

Therefore, the delay controller 6 may calculate the on-time and off-time of each channel using the above-mentioned formulae based on the switching period information Tsw1 and Tsw2, the reference voltage signals REF1 and REF2, and the input voltages Vin1 and Vin2. Accordingly, even when the switching period is variably set, it is possible to perform delay control similar to that in the second embodiment. Since the switching period=1/switching frequency, the delay controller 6 may perform calculation based on switching frequency information F1 and F2 of the respective channels instead of the switching period information Tsw1 and Tsw2.

5. Fourth Embodiment

Figure 8:
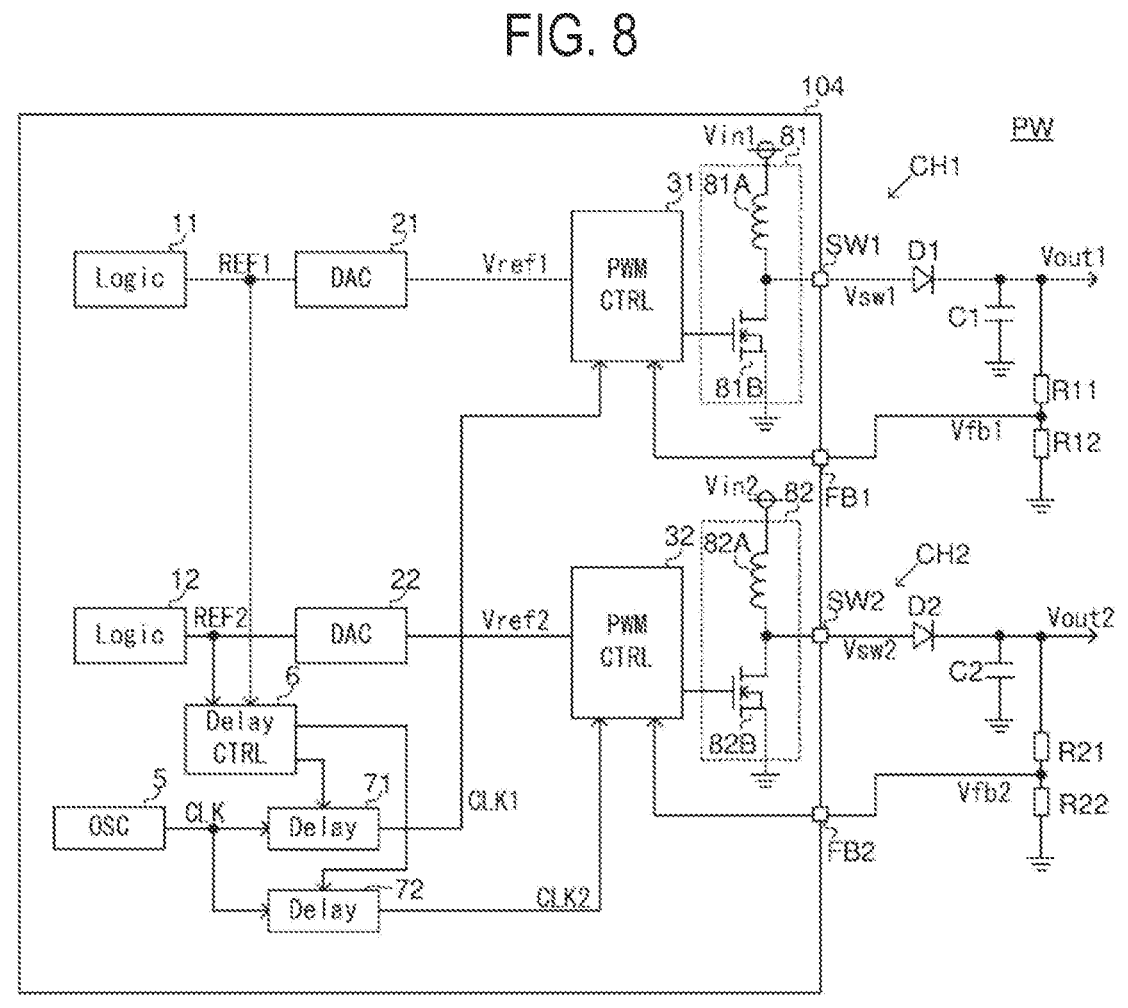

FIG. 8 is a diagram illustrating a configuration of a power supply control device 104 according to a fourth embodiment. The configuration shown in FIG. 8 differs from the configuration of the first embodiment (shown in FIG. 3) in that in the power supply control device 104, each of the DC/DC converter CH1 of channel 1 and the DC/DC converter CH2 of channel 2 is used as a step-up converter.

The DC/DC converter CH1 is a step-up converter that steps up the input voltage Vin1 to generate the output voltage Vout1, and includes a switch output stage 81, a diode D1, a capacitor C1, and voltage divider resistors R11 and R12.

The switch output stage 81 is built into the power supply control device 104, and includes an inductor 81A and a switching element 81B. At least a portion (e.g., the inductor 81A) of the switch output stage 81 may be provided outside the power supply control device 104. A first terminal of the inductor 81A is connected to an application terminal for the input voltage Vin1. A second terminal of the inductor 81A is connected to a drain of the switching element 81B. The switching element 81B includes an NMOS transistor. A source of the switching element 81B is connected to a ground terminal. A node to which the inductor 81A and the switching element 81B are connected is connected to a switch terminal SW1.

The diode D1, the capacitor C1, and the voltage divider resistors R11 and R12 are provided outside the power supply control device 104. The switch terminal SW1 is connected to an anode of the diode D1. A cathode of the diode D1 is connected to a first terminal of the capacitor C1. The output voltage Vout1 is generated at the first terminal of the capacitor C1.

The PWM controller 31 switches the switching element 81B by PWM control based on the clock CLK1, a feedback voltage Vfb1, and a reference voltage Vref1. As a result, the switching on-duty is adjusted so that the feedback voltage Vfb1 matches the reference voltage Vref1, and the output voltage Vout1 is controlled to a desired target value.

When the switching element 81B is in an on state, the switch voltage Vsw1 generated at the switch terminal SW1 becomes a low level, and when the switching element 81B is in an off state, the switch voltage Vsw1 becomes a high level.

The configuration for channel 2 is similar to the configuration for channel 1 described above, and will be described in a simplified manner. The DC/DC converter CH2 is a step-up converter that steps up the input voltage Vin2 to generate the output voltage Vout2, and includes a switch output stage 82, a diode D2, a capacitor C2, and voltage divider resistors R21 and R22. The switch output stage 82 includes an inductor 82A and a switching element 82B. The switching element 82B is switched by PWM control performed by the PWM controller 32, and thus the output voltage Vout2 is controlled. At this time, the switch voltage Vsw2 generated at the switch terminal SW2 has a pulse shape similar to the switch voltage Vsw1.

Figure 9:
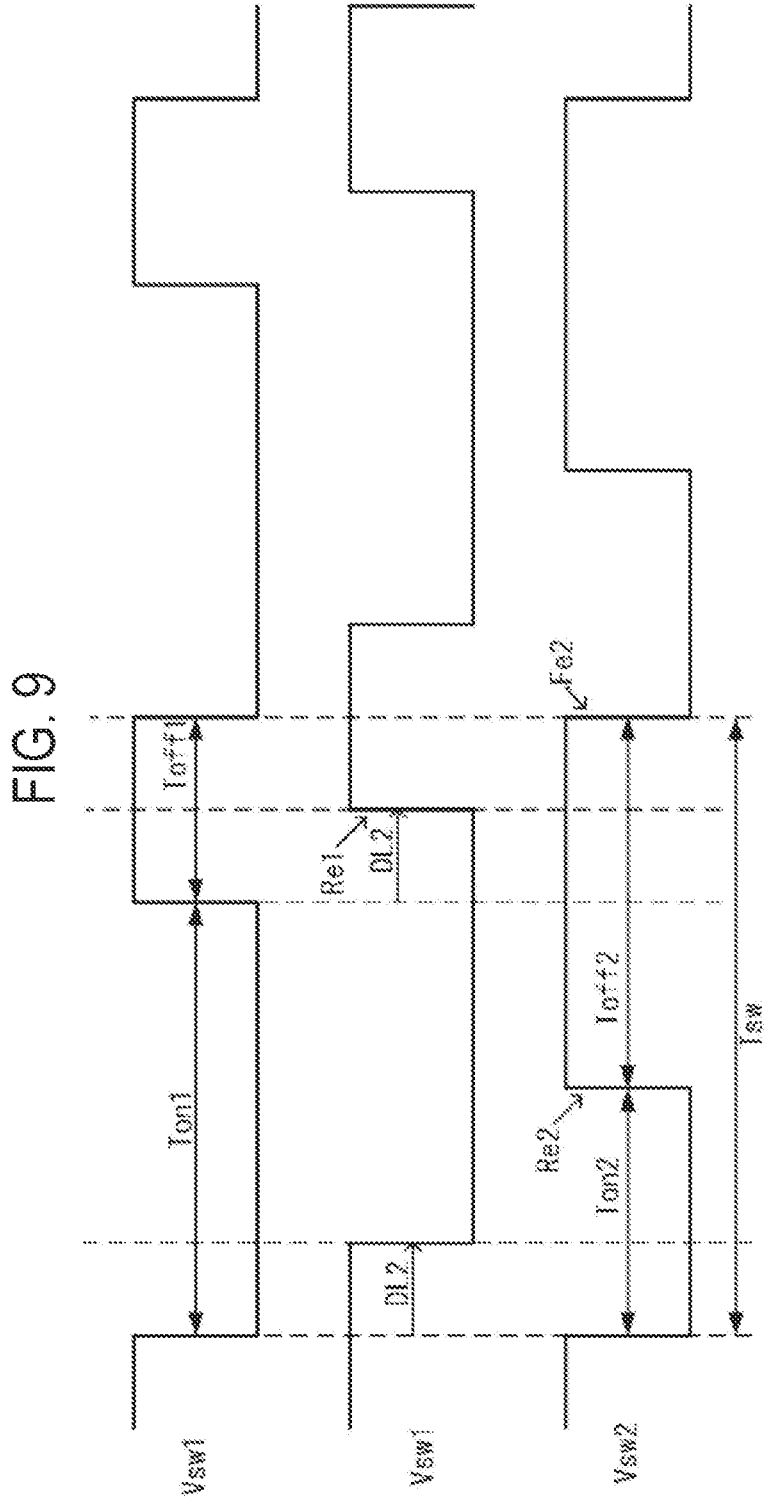
FIG. 9 is a diagram illustrating an example of waveform of a switch voltage according to the fourth embodiment.

FIG. 9 is a diagram illustrating an example of waveforms of the switch voltages Vsw1 and Vsw2 in the configuration shown in FIG. 8.

Since the DC/DC converters CH1 and CH2 are step-up converters, the respective on-duties Duty1 and Duty2 thereof are represented by the following formulae.

$$Duty1 = (Vout1 - Vin1)/Vout1$$

$$Duty2 = (Vout2 - Vin2)/Vout2$$

As shown in FIG. 9, the on-time Ton1 of the switch voltage Vsw1 (the period in which the switch voltage Vsw1 is at a low level due to the switching element 81B being in an on state) and the on-time Ton2 of the switch voltage Vsw2 (the period in which the switch voltage Vsw2 is at a low level due to the switching element 82B being in an on state) are represented by the following formulae, respectively.

$$Ton1 = Tsw \times Duty1 = Tsw \times ((Vout1 - Vin1)/Vout1)$$

$$Ton2 = Tsw \times Duty2 = Tsw \times ((Vout2 - Vin2)/Vout2)$$

As shown in FIG. 9, the off-time Toff1 of the switch voltage Vsw1 is a period in which the switch voltage Vsw1 is at a high level due to the switching element 81B being in an off state, and the off-time Toff2 of the switch voltage Vsw2 is a period in which the switch voltage Vsw2 is at a high level due to the switching element 82B being in an off state. The off-time Toff1 and the off-time Toff2 are represented by the following formulae.

$$Toff1 = Tsw - Ton1$$

$$Toff2 = Tsw - Ton2$$

If the input voltages Vin1 and Vin2 are fixed, a magnitude relationship between the on-times Ton1 and Ton2 is specified by the output voltages Vout1 and Vout2. The delay controller 6 determines the magnitude relationship between the on-times Ton1 and Ton2 based on the reference voltage signals REF1 and REF2, and turns on the delay circuit 71 or 72 corresponding to the channel having a longer on-time (while turning off the other delay circuit).

In the example of FIG. 9, since Ton1>Ton2, the delay circuit 71 corresponding to channel 1 is turned on, and the switch voltage Vsw1 is delayed with respect to Vsw2 by a delay time DL2. As a result, the rising edge Re1 of the switch voltage Vsw1 is spaced apart from the rising edge Re2 of the switch voltage Vsw2, so that the rising edges Re1 and Re2 are prevented from overlapping.

Although the delay time DL2 is a fixed value, as shown in FIG. 9, it is necessary to set the delay time DL2 to be shorter than the off-time Toff1 corresponding to the longer on-time Ton1. This makes it possible to prevent the rising edge Re1 of the switch voltage Vsw1 from overlapping with the falling edge Fe2 of the switch voltage Vsw2.

Figure 10:
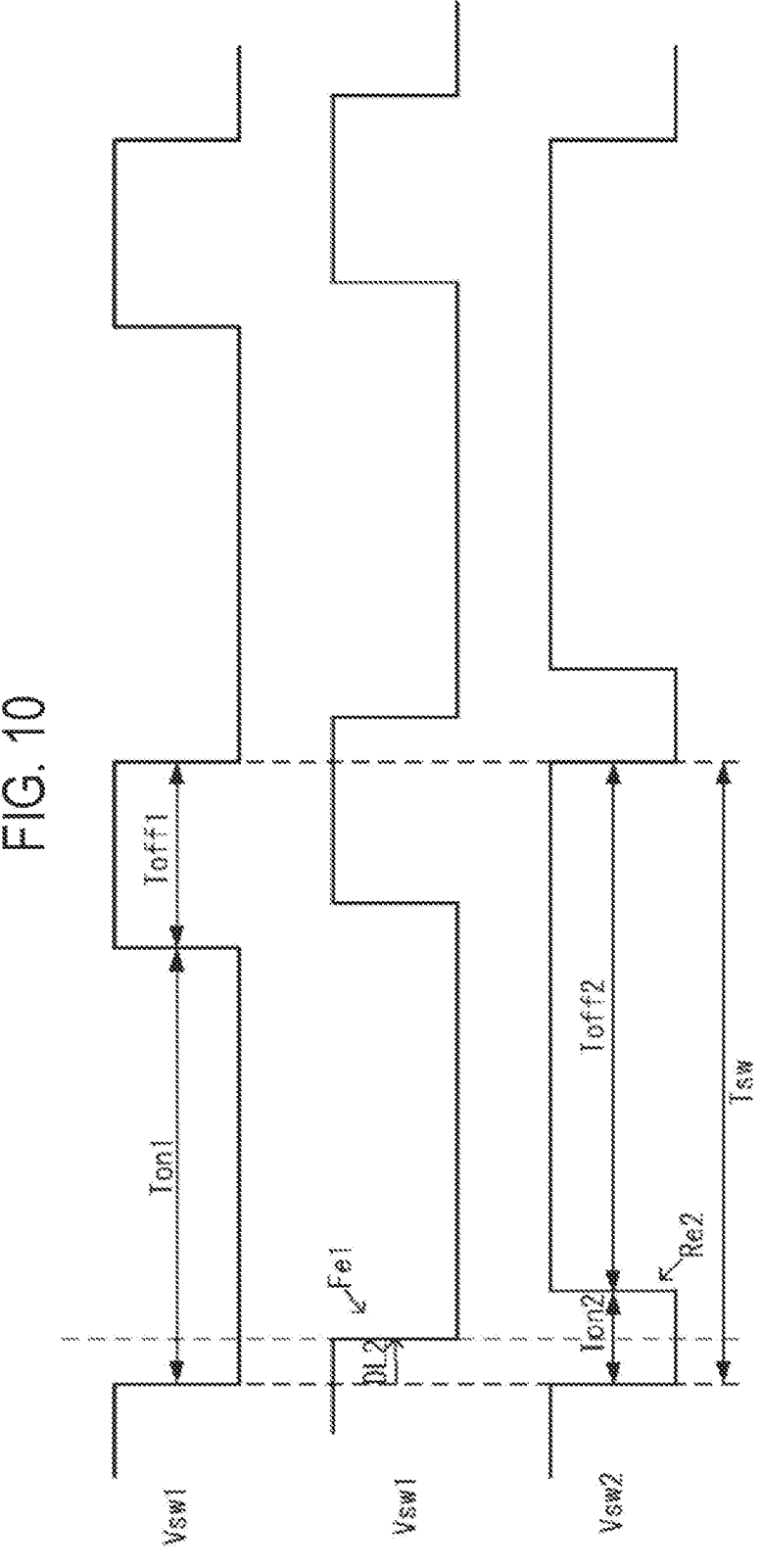
FIG. 10 is a diagram illustrating an example of waveform of a switch voltage according to the fourth embodiment.

As in an example of waveforms shown in FIG. 10, when the shorter on-time Ton2 is shorter than Toff1, the delay time DL2 needs to be shorter than Ton2. This makes it possible to prevent the falling edge Fe1 of the switch voltage Vsw1 from overlapping with the rising edge Re2 of the switch voltage Vsw2.

Further, as a modification of the present embodiment, as in the second embodiment, the delay controller 6 may calculate the on-times Ton1 and Ton2 based on at least one of the reference voltage signals REF1 and REF2 and the input voltages Vin1 and Vin2, and may determine a magnitude relationship between the on-times Ton1 and Ton2 from calculation results thereof. In this case, in the example shown in FIG. 9, the off-time Toff1 may be calculated and the delay time DL2 may be set to a predetermined ratio (e.g., 50%) of the off-time Toff1. Further, as in the example shown in FIG. 10, when Ton2<Toff1, the delay time DL2 may be set to a predetermined ratio (e.g., 50%) of the calculated on-time Ton2.

Further, as a further modification of the present embodiment, as in the third embodiment, the delay controller 6 may calculate the on-time and the off-time based on the switching period information Tsw1 and Tsw2 (or the switching frequency information F1 and F2) in addition to the reference voltage signals REF1 and REF2 and the input voltages Vin1 and Vin2.

6. Fifth Embodiment

Figure 11:
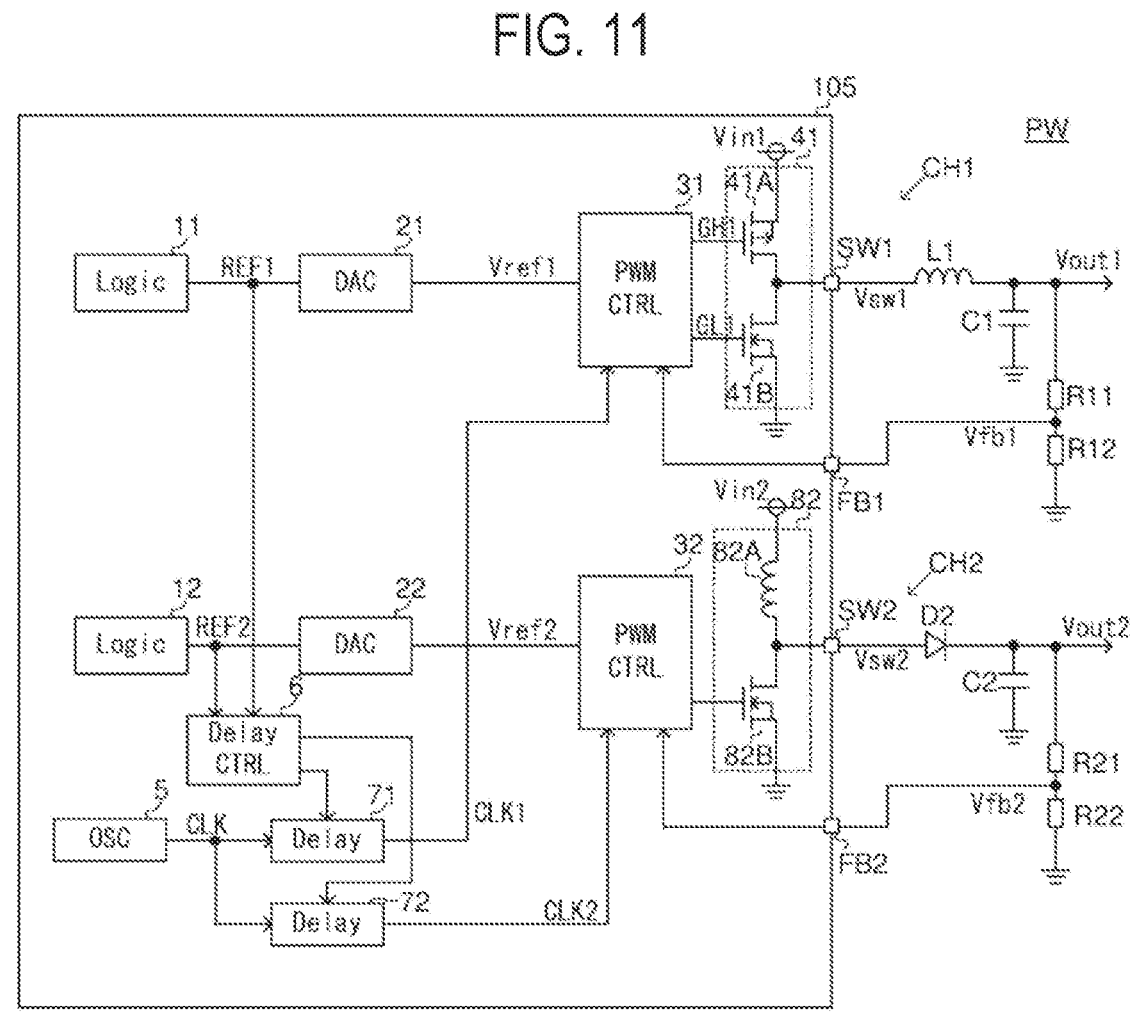

FIG. 11 is a diagram illustrating a configuration of a power supply control device 105 according to a fifth embodiment. The configuration shown in FIG. 11 differs from the configuration of the first embodiment (shown in FIG. 3) in that in the power supply control device 105, the DC/DC converter CH2 of channel 2 is configured as a step-up converter. That is, the power supply control device 105 controls the step-down converter of channel 1 and the step-up converter of channel 2.

As a result, as shown in FIG. 11, the switch output stage 41 is configured in channel 1, while the switch output stage 82 is configured in channel 2.

Figure 12:
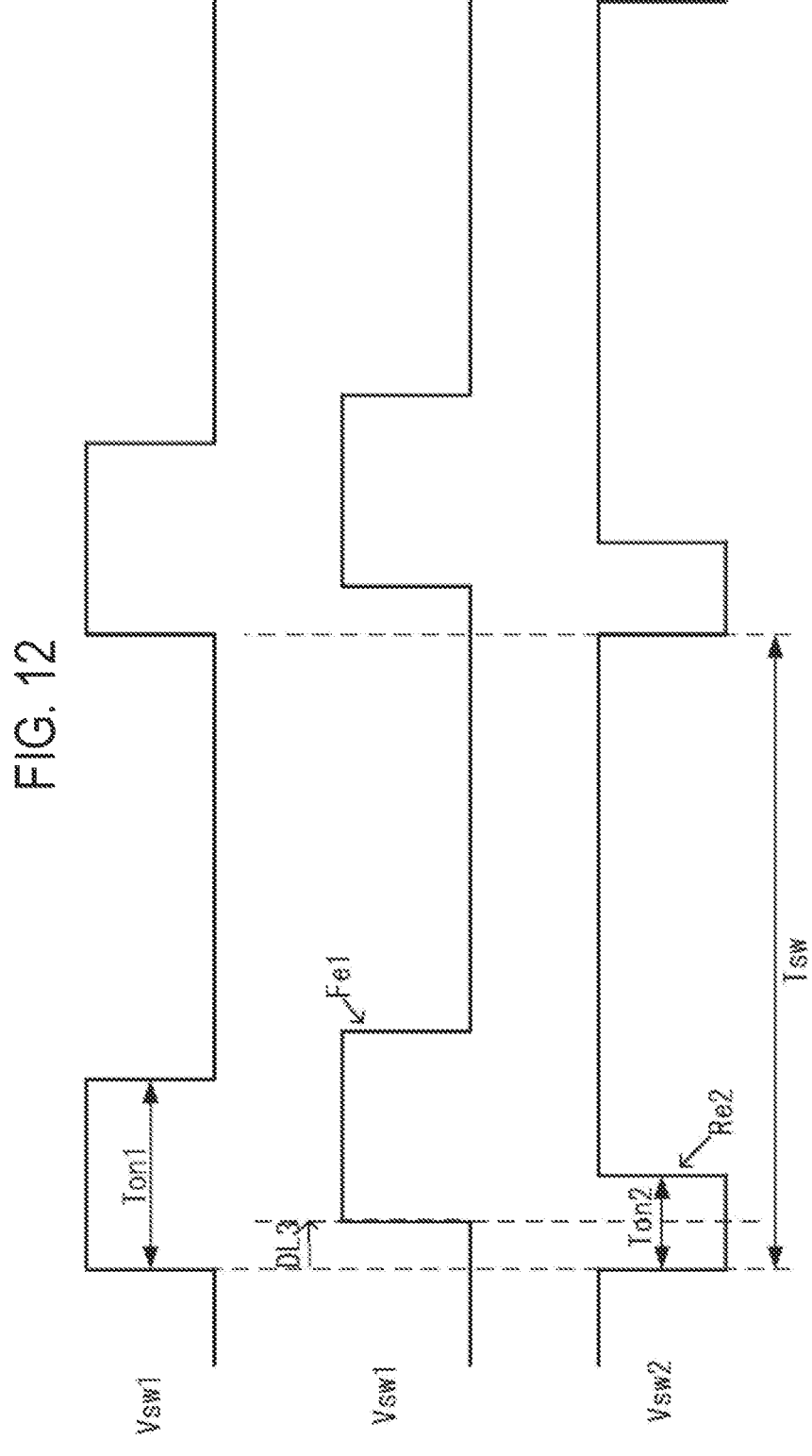
FIG. 12 is a diagram illustrating an example of waveform of a switch voltage according to the fifth embodiment.

FIG. 12 is a diagram showing an example of waveforms according to the present embodiment. As shown in FIG. 12, since the on-time Ton1 of the switch voltage Vsw1 is longer than the on-time Ton2 of the switch voltage Vsw2, the switch voltage Vsw1 is delayed by a delay time DL3 by turning on the delay circuit 71 corresponding to the channel with the longer on-time. Thus, the falling edge Fe1 of the switch voltage Vsw1 is spaced apart from the rising edge Re2 of the switch voltage Vsw2, so that the falling edge Fe1 and the rising edge Re2 are prevented from overlapping.

Also in the present embodiment, the on-time and the off-time may be calculated and the delay time DL3 may be set as in the second and third embodiments.

6. Others

Various technical features according to the present disclosure may be modified in addition to the above-described embodiments without departing from the gist of the technical creation thereof. That is, the above-described embodiments should be considered to be exemplary in all respects and not limitative, and the technical scope of the present disclosure is not limited to the above-described embodiments. It is to be understood that all changes falling within the meaning and range of equivalents of the claims are included in the technical scope of the present disclosure.

For example, when providing a delay between the clocks CLK1 and CLK2, each of the delay circuits 71 and 72 may be turned on, and a difference may be provided between the respective delay times.

For example, the power supply control device of the present disclosure is not limited to two channels, and may have three or more channels.

7. Supplementary Notes

As described above, one aspect of the present disclosure provides a power supply control device (101) configured to control a first DC/DC converter (CH1) of a first channel and a second DC/DC converter (CH2) of a second channel, wherein each of the first DC/DC converter and the second DC/DC converter is configured as one of a step-down converter and a step-up converter, wherein the step-down converter includes a first switch output stage (41) that includes a high-side transistor (41A) and a low-side transistor (41B) connected in series, wherein the step-up converter includes a second switch output stage (81) that includes a switching element (81B) connected to an inductor (81A), wherein a voltage generated at a node where the high-side transistor and the low-side transistor are connected or at a node where the inductor and the switching element are connected is defined as a switch voltage (Vsw1 or Vsw2), wherein a time in which the high-side transistor is turned on or a time in which the switching element is turned on is defined as an on-time (Ton1 or Ton2), and wherein the power supply control device includes:

a first PWM controller (31) configured to perform PWM control on the first switch output stage or the second switch output stage in the first DC/DC converter;

a second PWM controller (32) configured to perform PWM control on the first switch output stage or the second switch output stage in the second DC/DC converter; and a delay controller (6) configured to determine a magnitude relationship between on-times of the first channel and the second channel and perform control to delay a switch voltage of a channel corresponding to a longer on-time with respect to a switch voltage of a channel corresponding to a shorter on-time (first configuration).

The power supply control device of the first configuration, wherein the delay controller (6) may be configured to determine the magnitude relationship between the on-times based on parameters that define the on-times (second configuration).

The power supply control device of the second configuration, wherein the parameters may be output voltages (Vout1 and Vout2) of the first DC/DC converter and the second DC/DC converter (third configuration).

The power supply control device of the third configuration, wherein the delay controller (6) may be configured to determine the magnitude relationship between the on-times based on signals related to reference voltages, which are inputted to the first PWM controller and the second PWM controller to define the output voltages (fourth configuration).

The power supply control device of the fourth configuration, wherein the signals related to the reference voltages may be input signals of DA converters (21 and 22) that output the reference voltages (fifth configuration).

The power supply control device of any one of the second to fifth configurations, wherein the delay controller (6) may be configured to calculate the on-times based on at least one of output voltages of the first DC/DC converter and the second DC/DC converter, input voltages of the first DC/DC converter and the second DC/DC converter, and switching periods or switching frequencies of the first DC/DC converter and the second DC/DC converter, as the parameters, and determine the magnitude relationship based on the calculated on-times (sixth configuration).

The power supply control device of the sixth configuration, wherein the delay controller (6) may be configured to set a delay time as a first predetermined ratio of a shorter one of the calculated on-times (seventh configuration).

The power supply control device of the sixth configuration, wherein the delay controller (6) may be configured to set a delay time as a second predetermined ratio of an off-time corresponding to a longer one of the calculated on-times (eighth configuration).

The power supply control device of any one of the first to eighth configurations, further including:
    a first delay circuit (71) configured to delay a first input clock and output a first clock to the first PWM controller; and
    a second delay circuit (72) configured to delay a second input clock and output a second clock to the second PWM controller,
    wherein the first delay circuit and the second delay circuit may be controlled by the delay controller (ninth configuration).

Further, one aspect of the present disclosure provides a power supply device (PW), including:
    the power supply control device (101) of any one of the first to ninth configurations;
    the first DC/DC converter (CH1); and
    the second DC/DC converter (CH2) (tenth configuration).

The present disclosure may be used, for example, in power supply devices for various uses.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply control device configured to control a first DC/DC converter of a first channel and a second DC/DC converter of a second channel,
    wherein each of the first DC/DC converter and the second DC/DC converter is configured as one of a step-down converter and a step-up converter,
    wherein the step-down converter includes a first switch output stage that includes a high-side transistor and a low-side transistor connected in series,
    wherein the step-up converter includes a second switch output stage that includes a switching element connected to an inductor,
    wherein a voltage generated at a node where the high-side transistor and the low-side transistor are connected or at a node where the inductor and the switching element are connected is defined as a switch voltage,
    wherein a time in which the high-side transistor is turned on or a time in which the switching element is turned on is defined as an on-time, and
    wherein the power supply control device comprises:
        a first PWM controller configured to perform PWM control on the first switch output stage or the second switch output stage in the first DC/DC converter;
        a second PWM controller configured to perform PWM control on the first switch output stage or the second switch output stage in the second DC/DC converter; and
        a delay controller configured to determine a magnitude relationship between on-times of the first channel and the second channel and perform control to delay a switch voltage of a channel corresponding to a longer on-time with respect to a switch voltage of a channel corresponding to a shorter on-time.

2. The power supply control device of claim 1, wherein the delay controller is configured to determine the magnitude relationship between the on-times based on parameters that define the on-times.

3. The power supply control device of claim 2, wherein the parameters are output voltages of the first DC/DC converter and the second DC/DC converter.

4. The power supply control device of claim 3, wherein the delay controller is configured to determine the magnitude relationship between the on-times based on signals related to reference voltages, which are inputted to the first PWM controller and the second PWM controller to define the output voltages.

5. The power supply control device of claim 4, wherein the signals related to the reference voltages are input signals of DA converters that output the reference voltages.

6. The power supply control device of claim 2, wherein the delay controller is configured to calculate the on-times based on at least one of output voltages of the first DC/DC converter and the second DC/DC converter, input voltages of the first DC/DC converter and the second DC/DC converter, and switching periods or switching frequencies of the first DC/DC converter and the second DC/DC converter, as the parameters, and determine the magnitude relationship based on the calculated on-times.

7. The power supply control device of claim 6, wherein the delay controller is configured to set a delay time as a first predetermined ratio of a shorter one of the calculated on-times.

8. The power supply control device of claim 6, wherein the delay controller is configured to set a delay time as a second predetermined ratio of an off-time corresponding to a longer one of the calculated on-times.

9. The power supply control device of claim 1, further comprising:
    a first delay circuit configured to delay a first input clock and output a first clock to the first PWM controller; and
    a second delay circuit configured to delay a second input clock and output a second clock to the second PWM controller,
    wherein the first delay circuit and the second delay circuit are controlled by the delay controller.

10. A power supply device, comprising:
    the power supply control device of claim 1;
    the first DC/DC converter; and
    the second DC/DC converter.

* * * * *